(12) United States Patent
Bunker et al.

(10) Patent No.: US 6,978,621 B2
(45) Date of Patent: Dec. 27, 2005

(54) TURBO RECUPERATOR DEVICE

(75) Inventors: Ronald Scott Bunker, Niskayuna, NY (US); Chellappa Balan, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/331,342

(22) Filed: Dec. 31, 2002

(65) Prior Publication Data

US 2004/0123602 A1 Jul. 1, 2004

(51) Int. Cl.[7] .............................. F02C 6/08; F02C 7/18
(52) U.S. Cl. ............................. 60/782; 60/785; 60/806
(58) Field of Search ........................... 60/782, 785, 806

(56) References Cited

U.S. PATENT DOCUMENTS

| | | | | |
|---|---|---|---|---|
| 5,319,925 A | * | 6/1994 | Hendriks et al. | 60/39.511 |
| 5,611,197 A | | 3/1997 | Bunker | |
| 5,948,221 A | * | 9/1999 | Hsu | 204/270 |
| 6,105,362 A | * | 8/2000 | Ohtomo et al. | 60/805 |
| 6,295,803 B1 | | 10/2001 | Bancalari | |
| 6,530,229 B2 | * | 3/2003 | Yamanaka et al. | 60/806 |
| 6,691,519 B2 | * | 2/2004 | Little | 60/798 |

* cited by examiner

*Primary Examiner*—Ted Kim
(74) *Attorney, Agent, or Firm*—Penny A. Clarke; Patrick K. Patnode

(57) ABSTRACT

A device and method for recuperating a gas turbine engine comprises a compressor being configured to receive a coolant fluid stream, to compress the coolant fluid stream and to discharge the compressed coolant fluid stream to a turbine in fluid communication with the compressor. The compressed coolant fluid stream undergoing thermal exchange within the turbine, exit the turbine thereafter. A source of a working fluid stream is in fluid communication with the turbine. The working fluid stream is fluidly isolated from a portion of the coolant fluid stream and undergoing thermodynamic expansion through the turbine to extract energy therefrom. Where desired, the entire coolant fluid stream is fluidly isolated from the working fluid stream. At least a portion of the coolant fluid stream is channeled downstream of the turbine to supply a preheated process fluid stream to an adjacent system.

11 Claims, 3 Drawing Sheets

TURBO RECUPERATOR DEVICE

BACKGROUND OF INVENTION

The present invention relates generally to gas turbine engines and more particularly to process integration of the gas turbine engines with other process outside the gas turbine engine.

A gas turbine engine typically comprises in serial-flow relationship, an air intake (or inlet), a compressor, a combustor, a turbine, and a gas outlet (or exhaust nozzle). The compressed air at the compressor discharge is typically utilized by a combustor to generate a hot working fluid. The turbine components such as vanes, blades and static parts for example, which are in thermal contact with the hot working fluid experience a significant temperature rise during operation. It is therefore generally desirable to cool such components during operation to avoid thermal stresses generated by elevated temperatures and thermal gradients.

In conventional approaches, cooling is typically accomplished through bleeding a portion of the compressed air from the compressor and channeling the coolant fluid suitably through various local circuits of the turbine. In a conventional gas turbine engine, the coolant fluid stream typically mixes with the working fluid stream inside the turbine and the exhaust is directed to a stack through an exhaust heat recovery unit. Accordingly, the coolant fluid stream cannot be utilized as a process fluid for another process downstream of the turbine. Additionally, fuel requirement of the combustor to maintain a desired operating temperature at the turbine inlet cannot be optimized so as to maintain a desired operating efficiency range of the gas turbine engine. Although in practice some of the optimization may be performed, in general the system may not be fully optimized.

Currently employed techniques include, utilization of a separate recuperating mechanism, so as to preheat the compressed air. However, the increased pressure drop due to the recuperating mechanism has an adverse impact in maintaining thermodynamic efficiency of the gas turbine engine within the desired range.

In certain other techniques, a portion of the fluid compressed by the main compressor of the gas turbine engine, is extracted from a plenum chamber surrounding the combustor and the coolant fluid stream is accordingly channeled through a cooling circuit in the turbine to cool the turbine components. The coolant fluid stream is further channeled through another off board auxiliary compressor and a heat exchanger disposed adjacent to the turbine. Consequently, the coolant fluid stream is returned to the combustor or combustor plenum chamber after cooling the turbine components. Although in general, cooling of the turbine components is performed in a closed circuit manner however in practice, some of the coolant fluid stream may mix with the working fluid stream in the working fluid flow path of the turbine.

Certain other closed-circuit cooling techniques for gas turbine engines extract coolant fluid from any suitable stage of the main compressor. The coolant fluid stream is returned to a suitable injection stage of the main compressor having a lower pressure than the extraction stage so as to drive the coolant fluid through the closed circuit in the turbine without mixing with the working fluid stream. Although the techniques described above may reduce aero-thermodynamic losses of the gas turbine engine to a certain extent, either a portion or entire of the preheated coolant fluid stream cannot be utilized as a process fluid stream for an adjacent system typically outside a control volume of the gas turbine engine.

Accordingly, there is a need in the art of gas turbine engines for an improved technique which can utilize at least a portion of the preheated coolant fluid stream as a process fluid stream for another process, while maintaining overall thermodynamic efficiency of the gas turbine engine.

BRIEF DESCRIPTION

The present technique is designed to respond to such needs. Briefly, in accordance with one embodiment of the present technique, a gas turbine engine comprises a compressor having an inlet and outlet, the compressor being configured to receive a coolant fluid stream to compress the coolant fluid stream and to discharge the compressed coolant fluid stream. A turbine is in fluid communication with the compressor for receiving the compressed coolant fluid stream from the compressor outlet. The compressed coolant fluid stream undergoing thermal exchange within the turbine, exit the turbine thereafter. A source of a working fluid stream is in fluid communication with the turbine. The working fluid stream is fluidly isolated from a portion of the coolant fluid stream and undergoing thermodynamic expansion through the turbine to extract energy therefrom. Where desired, the entire coolant fluid stream is fluidly isolated from the working fluid stream. At least a portion of the coolant fluid stream is channeled downstream of the turbine to supply a preheated process fluid stream to an adjacent system.

A method embodiment for power generation of a gas turbine engine provides compressing a coolant fluid stream in a compressor, transferring the compressed coolant fluid stream from the compressor to a turbine which is in fluid communication with the compressor, transferring heat between the coolant fluid stream and the turbine, receiving a working fluid stream to the turbine from a source of a working fluid stream which is in fluid communication with the turbine, and expanding thermodynamically the working fluid stream extracting energy therefrom. A portion of the extracted energy therefrom driving the compressor thereby. The working fluid stream, which is fluidly isolated from a portion of the coolant fluid stream exit the turbine accordingly. Where desired, the entire coolant fluid stream is fluidly isolated from the working fluid stream.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

A gas turbine engine is an energy conversion device used to generate power from aero-thermodynamic expansion of a hot pressurized working fluid. A typical gas turbine includes a compressor for compressing a fluid for combustion which is suitably mixed with a fuel and ignited accordingly to generate combustion gas in a combustor disposed in flow communication with a turbine which extracts energy by aero-thermodynamic expansion of the hot pressurized combustion gas producing output power thereby, such as by driving an electrical generator.

Figure 1:
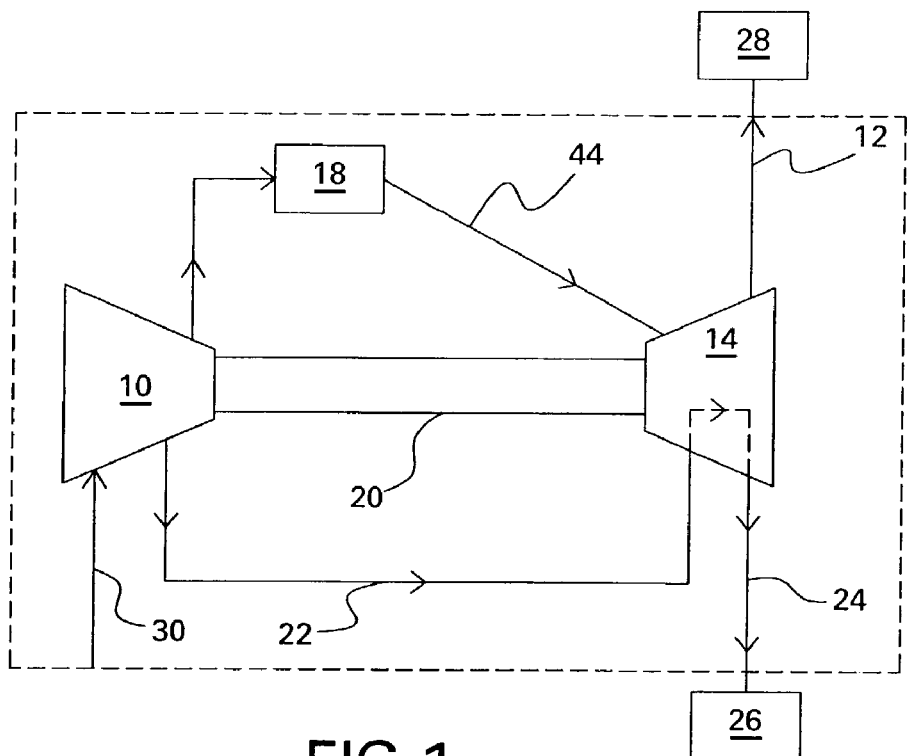
FIG. 1 is a diagrammatical view of an exemplary gas turbine engine having a turbine and a compressor in accordance with one aspect of the present technique.

Accordingly, in an exemplary embodiment of the present technique illustrated in FIG. 1, a gas turbine engine comprises a compressor 10, which receives an inlet fluid stream 30. The inlet fluid stream 30 is compressed typically in various stages in the compressor 10. A portion of the compressed fluid stream is channeled to discharge the compressed coolant fluid stream 22 to the turbine 14 in fluid communication with the compressor 10. Accordingly, balance portion of the compressed coolant fluid stream 22 is channeled to a source 18 of working fluid stream 44, typically a combustor. The turbine 14 receives the working fluid stream 44 from the combustor 18, which is in fluid communication with the turbine 14.

In accordance with the present technique, the compressed coolant fluid stream 22 undergoes thermal exchange with turbine components, for example the rotor, casing, shrouds and nozzles internal to the turbine 14, while passing through different coolant circuits within the turbine 14. The working fluid stream 44 undergoes thermodynamic expansion, in the turbine 14 to extract energy therefrom. A portion of the extracted energy is utilized to drive the compressor 10 coupled to the turbine 14 through a drive shaft 20.

As further illustrated in FIG. 1, the coolant fluid stream 22 and the working fluid stream 44 are fluidly isolated from each other within the turbine 14. The isolation of the fluid streams affords several advantages, including maintaining temperature of the working fluid stream at the turbine entry, within a desired range of, for example, between about 900° C. to about 1200° C. Moreover, maintaining temperature of the working fluid stream 44 at the turbine 14 entry helps in optimizing pressure ratio of entry and exit pressure of the working fluid stream 44 within the turbine 14. Accordingly, optimizing pressure ratio between entry and exit pressure of the working fluid stream 44 within the turbine 14 helps maintain overall thermodynamic efficiency of the gas turbine engine, within a desired range.

Moreover, in accordance with one aspect of the present technique, a portion of the coolant fluid stream 22 which is preheated by passing through different coolant circuits inside the turbine 14, is channeled downstream of the turbine 14, to supply at least one preheated process fluid stream 24 to an adjacent system for example a system 26 downstream of the turbine 14, as depicted in FIG. 1. Concurrently, as further illustrated in FIG. 1, the working fluid stream 44 after exiting the turbine 14 may be utilized as another process fluid stream 12 to another system 28 downstream of the turbine 14. Accordingly, the present technique provides operating the turbine at a desired efficiency level with an integrated means to recuperate the working fluid stream while utilizing at least a portion of the preheated coolant fluid stream 24 as the process fluid stream 24 to the system 26 typically outside a control volume 16 of the gas turbine engine.

In one embodiment, shown in FIG. 1 and FIG. 3 through FIG. 5, the process 26, 28 downstream of the turbine 14 is a separate system outside the control volume 16 of the gas turbine engine which ideally do not influence operating conditions of the gas turbine engine. However, as will be appreciated by those skilled in the art, under certain circumstances, the system outside the control volume 16 of the gas turbine engine may influence the operating conditions of the gas turbine engine, such as due to back pressure for example.

Figure 2:
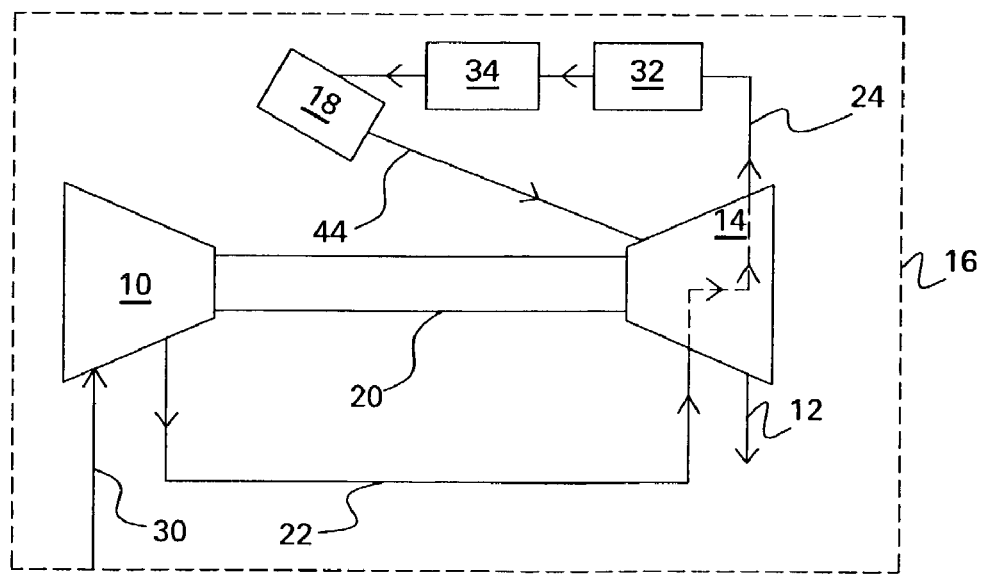
FIG. 2 is a similar diagrammatical view of an exemplary gas turbine engine assembly incorporating a combustor in accordance with another aspect of the present technique, illustrating the preheated coolant fluid stream used as the working fluid stream after channeling through the combustor.

In other embodiment, illustrated in FIG. 2, the coolant fluid stream 22 cools the turbine 14 after passing through the coolant circuits of the turbine 14, without fluidly communicating with the working fluid stream 44. Accordingly, as further illustrated in FIG. 2 the coolant fluid stream 22 is delivered as the preheated process fluid stream 24 to the source 18 of the working fluid stream 44, typically a combustor. Consequently, the source 18 is configured to deliver the working fluid stream 44 to the turbine 14 undergoing typical thermodynamic expansion to extract energy therefrom and the working fluid stream 44 is exhausted from the turbine 14 thereafter. The preheated process fluid stream 24 being delivered to the combustor 18 via a compressor 32 (if desired) and a heat exchanger 34 (if desired). Therefore, in accordance with the aspect of the present technique depicted in FIG. 2, the preheated process fluid stream 24 is used as the working fluid stream 44 after channeling through the combustor 18.

Figure 3:
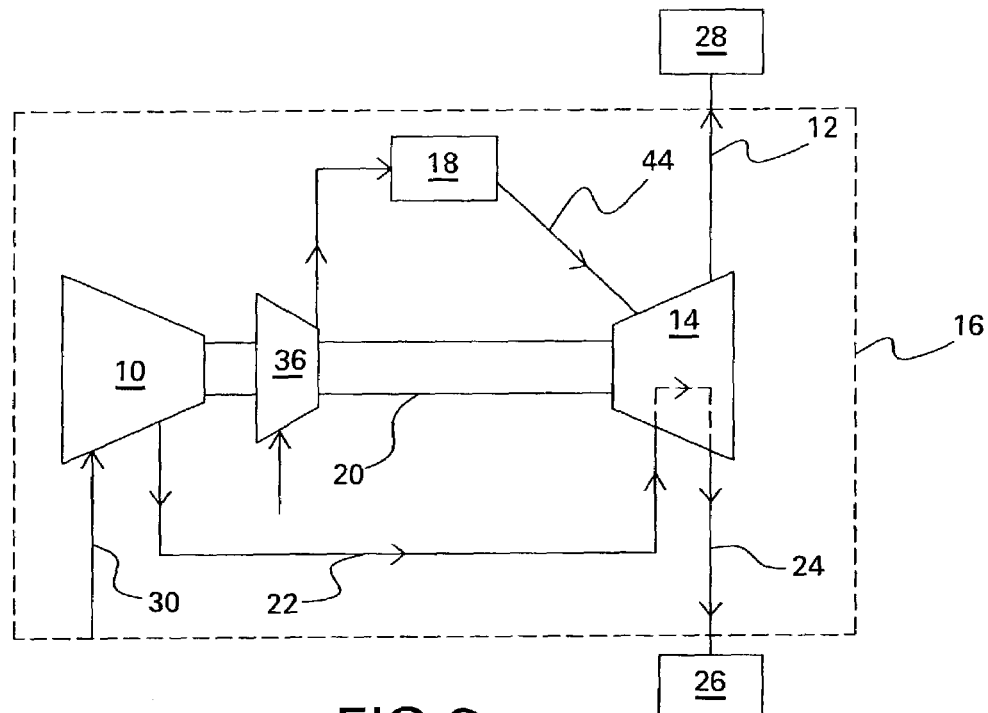
FIG. 3 is a diagrammatical view of an exemplary gas turbine engine incorporating different compressors for the working fluid stream and the coolant fluid stream in accordance with yet another aspect of the present technique.

In another embodiment shown in FIG. 3, the compressor 10 is used to supply the coolant fluid stream 22 to the turbine 14, while a separate compressor 36 is used to supply the fluid for combustion to the source 18 of the working fluid stream. The coolant fluid, may include, without limitation, air, superheated steam, and a mixture thereof. The compressors 10, 36 comprise at least one of a single stage compressor or a multi stage compressor. In one embodiment, the source 18 of the working fluid 44 comprises a combustor. The combustor may include, without limitation, an annular combustor, a tubular combustor, a silo combustor and a combination thereof. In other embodiment, the source 18 of the working fluid comprises a fuel cell. The fuel cells may include without limitation solid oxide fuel cells, and molten carbonate fuel cells.

Figure 4:
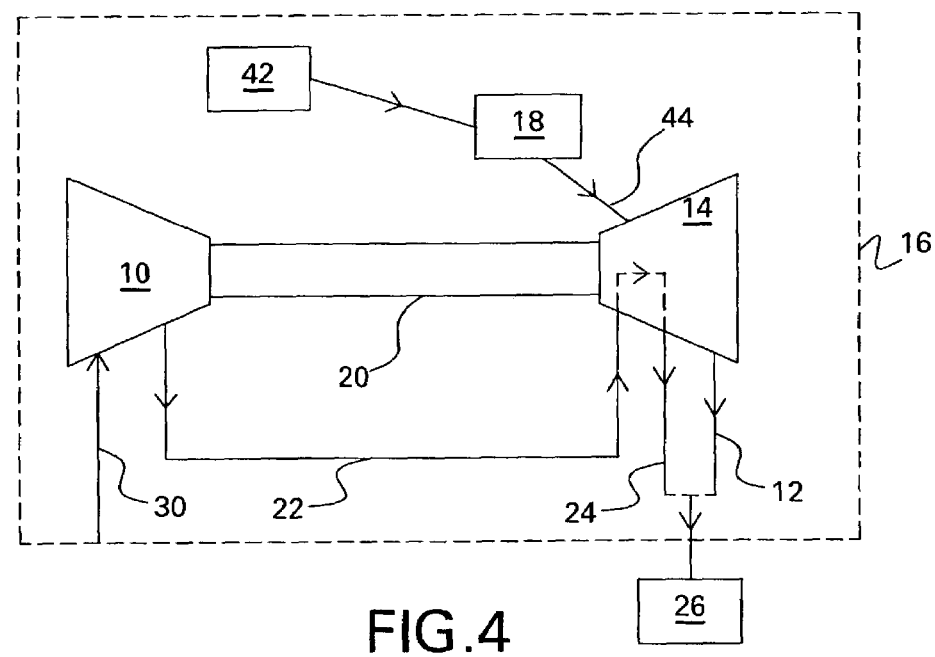
FIG. 4 is diagrammatical view of an exemplary gas turbine engine illustrating mixing of the coolant fluid stream and the working fluid stream downstream of the turbine.

In another embodiment shown in FIG. 4, another system 42, upstream of the source 18 of the working fluid, delivers fluid for combustion to the source 18 of working fluid, typically a combustor. In one embodiment, at least a portion of the working fluid stream 44 mixes with at least a portion of the coolant fluid stream 22 downstream of the turbine 14 to supply the preheated process fluid stream 12, 24 to the system 26 typically outside the control volume 16 of the gas turbine engine. In other embodiment, shown in FIG. 5, the working fluid stream 44 and the coolant fluid stream 22 enters into a heat exchanger 46 downstream of the turbine 14 to undergo thermal exchange and supply a preheated process fluid stream 12, 24 to the system 26, 48 typically outside the control volume 16 of the gas turbine engine.

A method embodiment in accordance with present technique for generating power from a gas turbine engine comprises compressing a coolant fluid stream in a compressor 10, transferring the compressed coolant fluid stream 22 from the compressor 10 to a turbine 14, transferring heat between the coolant fluid stream 22 and the turbine components, (not shown), for example rotor, casing, shroud, and nozzle, which are in thermal contact with the working fluid stream 44 and receiving a working fluid stream 44 to the turbine 14 from a source 18 of the working fluid stream 44 in fluid communication with the turbine 14. The working fluid stream 44 being fluidly isolated from either a portion or entire of the coolant fluid stream 22, is expanded thermodynamically in the turbine 14 to extract energy therefrom.

Again, isolating coolant fluid stream 22 and the working fluid stream 44 within the turbine 14 is desirable for aerothermodynamic reasons such as maintaining temperature of the working fluid stream 44 at the turbine entry, within a desired range for example between about 900° C. to about 1200° C. Maintaining temperature of the working fluid stream 44 at the turbine 14 entry helps in optimizing pressure ratio of entry and exit pressure of the working fluid stream 44 within the turbine 14. Optimizing pressure ratio between entry and exit pressure of the working fluid stream 44 in the turbine 14, helps maintaining overall thermodynamic efficiency of the gas turbine engine, within a desired range.

It should be noted that in the embodiments discussed above, a portion of the extracted energy from the working fluid stream 44 is utilized for driving the compressor 10. Moreover, in accordance with aspects of the present technique, heat may be transferred between the working fluid stream 44 and the coolant fluid stream 22 downstream of the turbine 14 undergoing thermal exchange therein, to supply a preheated process fluid stream 12, 24 to an adjacent system for example a system 26 downstream of the turbine 14, as depicted in FIG. 1. In one embodiment shown in FIG. 2, the system may include a combustor 18 for the turbine 14, receiving the preheated process fluid stream 24 via a compressor 32 (if desired) and a heat exchanger 34 (if desired). Therefore, in accordance with this aspect of the method embodiment depicted in FIG. 2, the preheated process fluid stream 24 is used as working fluid stream 44 after channeling through the combustor 18.

In another method embodiment shown in FIG. 4, transferring heat between the working fluid stream 44 and the coolant fluid stream 22 downstream of the turbine 14 comprises mixing of the working fluid stream 44 and the coolant fluid stream 22 downstream of the turbine 14 for delivering the preheated process fluid stream 12, 24 to the system 26 typically outside a control volume 16 of the gas turbine engine.

Figure 5:
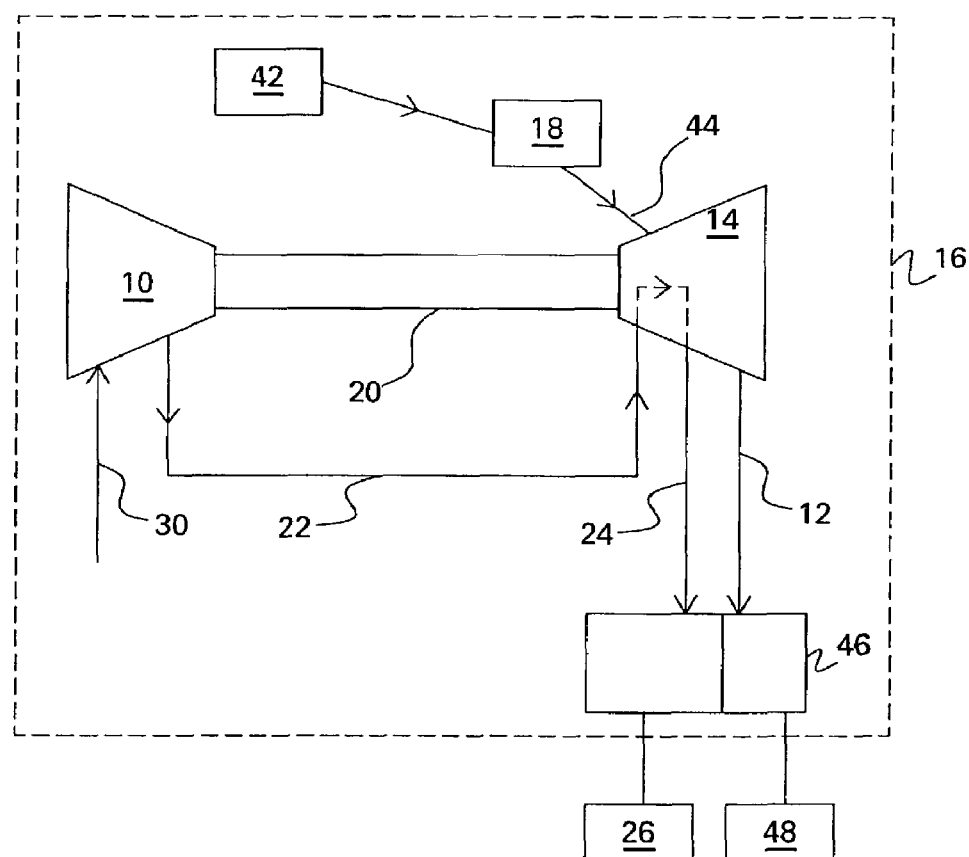
FIG. 5 is a diagrammatical view of an exemplary gas turbine engine illustrating thermal exchange of the working fluid stream and the coolant fluid stream in a heat exchanger downstream of the turbine.

In other embodiment shown in FIG. 5, transferring heat between the working fluid stream 22 and the coolant fluid stream 44 downstream of turbine 14 comprises thermal exchange between the working fluid stream 44 and the coolant fluid stream 22 in a heat exchanger 46 downstream of the turbine 14 for supplying the preheated process fluid stream 12, 24 to the system 26, 48 typically outside the control volume 16 of the gas turbine engine.

As will be appreciated by those skilled in the art, the present technique thus provides for operating a turbine at a desired efficiency level with integrated recuperation of the working fluid stream, while utilizing at least a portion of a preheated coolant fluid stream as the process fluid stream 12, 24 to another process outside the control volume 16 of the gas turbine engine. The technique also facilitates providing of the coolant fluid stream by utilizing energy produced by the turbine itself to drive a compressor that supplies the coolant fluid stream.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A gas turbine engine comprising:
   a compressor having an inlet and an outlet, the compressor being configured to receive a coolant fluid stream, to compress the coolant fluid stream and to discharge the compressed coolant fluid stream;
   a turbine in fluid communication with the compressor for receiving the compressed coolant fluid stream from the compressor outlet, the compressed coolant fluid stream undergoing thermal exchange with the turbine and exiting the turbine thereafter; and
   a source of a working fluid stream in fluid communication with the turbine, the working fluid stream being fluidly isolated from at least a portion of the coolant fluid stream, undergoing thermodynamic expansion through the turbine to extract energy therefrom and exiting the turbine thereafter, a portion of the extracted energy being utilized to drive the compressor, wherein at least a portion of the coolant fluid stream being preheated in the turbine is channeled downstream of the turbine to supply a preheated process fluid stream to an adjacent system configured as a separate system, which is outside of a control volume of the gas turbine engine and does not return the preheated process fluid stream to the control volume of the gas turbine engine, and wherein the coolant fluid stream received by the turbine consists of the compressed coolant fluid stream received from the compressor.

2. The gas turbine engine of claim 1, wherein the compressor is selected from the group consisting of a centrifugal compressor, an axial flow compressor, and a combination of centrifugal and axial flow compressor.

3. The gas turbine engine of claim 2, wherein the compressor comprises at least one of a single stage compressor or a multi stage compressor.

4. The gas turbine engine of claim 1, wherein the source of a working fluid comprises at least one of a combustor and a fuel cell.

5. The gas turbine engine of claim 4, wherein the combustor is selected from the group consisting of an annular combustor, a tubular combustor a silo combustor and a combination thereof.

6. The gas turbine engine of claim 4, wherein the fuel cell comprises at least one of a solid oxide fuel cell or a molten carbonate fuel cell.

7. The gas turbine engine of claim 1, wherein the coolant fluid stream is selected from the group consisting of air, superheated steam, and a mixture thereof.

8. A gas turbine engine comprising:
   a compressor having an inlet and outlet, the compressor being configured to receive a coolant fluid stream, to compress the coolant fluid stream and to discharge the compressed coolant fluid stream;
   a turbine in fluid communication with the compressor for receiving the compressed coolant fluid stream from the compressor outlet, the compressed coolant fluid stream undergoing thermal exchange within the turbine and exiting the turbine thereafter; and
   a source of a working fluid stream in fluid communication with the turbine, the working fluid stream being fluidly isolated from a portion of the coolant fluid stream and undergoing thermodynamic expansion through the turbine to extract energy therefrom;

wherein, at least a portion of the coolant fluid stream being preheated in the turbine is channeled downstream of the turbine to supply a preheated process fluid stream to an adjacent system configured as a separate system, which is outside of a control volume of the gas turbine engine and does not return the preheated process fluid stream to the control volume of the gas turbine engine, and wherein the coolant fluid stream received by the turbine consists of the compressed coolant fluid stream received from the compressor.

9. The gas turbine engine of claim 8, wherein a portion of the energy extracted from the thermodynamic expansion of the working fluid stream is utilized to drive the compressor.

10. A method for power generation of gas turbine engine comprising:
   compressing a coolant fluid stream in a compressor;
   transferring the compressed coolant fluid stream from the compressor to a turbine, the turbine being in fluid communication with the compressor;
   transferring heat between the coolant fluid stream and the turbine, the coolant fluid stream exiting the turbine thereafter;
   receiving a working fluid stream to the turbine from a source of a working fluid stream in fluid communication with the turbine, the working fluid stream being fluidly isolated from a portion of the coolant fluid stream;
   expanding thermodynamically the working fluid stream and extracting energy therefrom, the working fluid stream exiting the turbine thereafter, a portion of the extracted energy driving the compressor; and
   supplying a preheated process fluid stream to an adjacent system configured as a separate system, which is outside of a control volume of the gas turbine engine and does not return the preheated process fluid stream to the control volume of the gas turbine engine, wherein the coolant fluid stream received by the turbine consists of the compressed coolant fluid stream received from the compressor.

11. The method of claim 10, wherein supplying the preheated process fluid stream comprises channeling at least a portion of the coolant fluid stream downstream of the turbine for delivering the preheated coolant fluid stream to the system downstream of the turbine.

* * * * *